United States Patent [19]

Rockland et al.

[11] 4,124,727

[45] Nov. 7, 1978

[54] NUTRITIONALLY BALANCED PROTEIN SNACK FOOD PREPARED FROM LEGUME SEEDS

[75] Inventors: Louis B. Rockland, Moraga; Thomas M. Radke, San Pablo, both of Calif.

[73] Assignee: The United States of America as represented by the Secretary of Agriculture, Washington, D.C.

[21] Appl. No.: 789,375

[22] Filed: Apr. 20, 1977

[51] Int. Cl.$^2$ .................................................. A23L 1/20
[52] U.S. Cl. ..................................... 426/549; 426/560; 426/629; 426/634; 426/441; 426/508; 426/517
[58] Field of Search ............... 426/104, 634, 637, 643, 426/646, 441, 517, 508, 622, 629, 656, 549, 560

[56] References Cited
PUBLICATIONS

Brooks, K., "The Forget-About Meat Cookbook," Rodale Press, Inc., Emmaus, Pa., pp. 20-30.

*Primary Examiner*—Robert A. Yoncoskie
*Attorney, Agent, or Firm*—M. Howard Silverstein; David G. McConnell; Theodore J. Leitereg

[57] ABSTRACT

Novel food products are prepared from legume seeds by (a) treating the seeds to render them quick-cooking, (b) cooking the seeds and mashing them, (c) combining the cooked and mashed seeds with methionine-containing ingredients such as cereal grain flours, oil seeds, oil seed flours, and the like, (d) adding water to the mixture to form a dough, (e) extruding the dough into sheets, (f) cutting the sheets into pieces, and (g) frying the pieces in edible oil.

7 Claims, No Drawings

NUTRITIONALLY BALANCED PROTEIN SNACK FOOD PREPARED FROM LEGUME SEEDS

BACKGROUND OF THE INVENTION

1. Field of the Invention

This invention relates to and has among its objects the provision of novel snack items prepared from legume seeds and novel processes for making them. It is a particular object of the invention to provide novel snack items in which the proteins are balanced to provide optimum nutrition. Further objects of the invention will be evident from the following description wherein parts and percentages are by weight unless otherwise specified.

2. Description of the Prior Art

Snack items have assumed a very prominent role in the American diet, especially for the young. Most snack items, although generally tasty, are lacking in nutrition. Potato chips, for example, are consumed in large quantities but contain only a minimal amount of protein. One means for rendering snack items more nutritious is to fortify them with protein, vitamins, minerals, and the like.

Snack items prepared from materials rich in protein are another answer to the above problem. Legume seeds contain a high percentage of protein and some water-soluble vitamins. However, utilization, in general, of legume seeds is hindered by the relatively lengthy procedures required to prepare them for consumption. Furthermore, nutritional snack items prepared from legume seeds must be appealing to the palate to allow these snacks to compete with other non-nutritional, yet popular, snack food items.

SUMMARY OF THE INVENTION

The invention described herein provides means for obtaining novel snack items from legume seeds. In the process of the invention, legume seeds are first treated to render them quick-cooking. Next, the so-treated seeds are cooked and mashed. The cooked and mashed seeds are mixed with a methionine-containing material and then water is added to the mixture to raise the total moisture content of the mixture thereof and thereby form a dough. The dough is extruded into sheets, which are cut into pieces and then fried in edible oil.

In an alternate embodiment of the invention the cooked seeds can be dried and the dried seeds ground into a powder prior to their combination with other ingredients.

An advantage of the invention is that the legume seed snack item is not only flavorful but it also is an excellent source of high quality protein, i.e., its protein is optimal with respect to balance of essential amino acids. Thus, the efficiency of the protein for growth, or in other words, the nutritional quality of the proteins, is substantially enhanced. Thus, good nutrition is assured despite the fact that the present product is a snack food. Since the product is fried in edible oil, it provides a good balance of protein and fat for the human diet.

Another advantage of the invention is that the well-balanced, nutritional snack item is ready-to-eat. Utilization of legume seeds is hindered somewhat by the lengthy procedures required to make them ready for the table. The product of the invention is convenient in that no cooking or other preparation of the item is required by the consumer.

Another advantage of the invention is that many legume seeds which are rich in protein can now be incorporated into the human diet in a manner acceptable to most individuals.

DESCRIPTION OF THE PREFERRED EMBODIMENTS

The primary object of the invention is the provision of novel, ready-to-eat legume seed products and processes for making them. Basically, the objects of the invention are attained by applying the following operations.

The legume seeds are first treated to render them quick-cooking. The methods of achieving this result are described generally in U.S. Pat. Nos. 3,869,556, 3,318,708, 3,352,687, and 3,635,728. Legume seeds are soaked in approximately three times their volume of water containing small amounts of sodium chloride, sodium bicarbonate, and sodium carbonate. Soaking is carried out for a period of about 2 to 24 hours (depending upon the bean variety) and usually at ambient temperature and atmospheric pressure. The soaked seeds are removed from the medium and may be rinsed with water to prepare them for the next step in the process of the invention.

After the seeds are rendered quick-cooking, they are cooked in water preferably at a temperature of 100° C. for a period of about 5 to 20 minutes or until they are tender. Then, the cooked legume seeds are mashed to decrease their particle size so that they may readily be formed into a dough. Conventional mashing techniques and apparatus may be employed. Generally, the cooked seeds are combined with water prior to the mashing step to facilitate the mashing operation; approximately 20 to 30% water, based on the weight of the mash, is ordinarily added.

The cooked and mashed seeds from above are used to prepare the snack product of the invention and are combined with methionine-containing material. The proportions of legume seeds and methionine-containing material is important to the production of a nutritionally balanced snack food. As a general rule, the proportions of these ingredients should be determined in order to yield a mixture containing about 2.0–2.6% methionine and 4.0–6.0% lysine in the protein. Legume seeds contain a high proportion of lysine but are deficient in methionine. The amino acid content of legume seeds as well as other protein materials are readily ascertainable since these values have been compiled for publication. For example, values can be found in "Amino Acid Content of Foods and Biological Data on Proteins," Food Policy and Food Science Service, Nutrition Division, Food and Agricultural Organization of the United Nations, Rome, Italy (1970), hereinafter referred to as FAO.

Methionine-containing materials which can be used in the process of the invention include, but are not limited to, cereal grain flours, oil seeds, oil seed flours, and the like. Typical cereal grains are wheat, oat, rice, barley, triticale, corn, etc. Examples of oil seeds are peanuts, cotton seed, rape seed, sunflower seed, safflower seed, sesame seed, and the like. Also included are materials containing those amino acids which are equivalent to or assist methionine, such as cystine and the like.

As mentioned above, the amino acid content, particularly the methionine and lysine content, of the legume seeds and the above-named materials is readily available. To obtain a nutritionally balanced snack item the proper amount of methionine-containing material must be added to the legume seeds to yield a mixture containing 2.0–2.6% methionine and 4.0–6.0% lysine, based on the total weight of protein. For a two component system the proportions of legume seed material and of methionine-containing material can be determined according to the following equations:

$$M_D = \frac{\sum_{i=1}^{n} X_i P_i M_i}{\sum_{i=1}^{n} X_i P_i} \text{ and}$$

$$\sum_{i=1}^{n} X_i = 100$$

wherein $M_D$ = percent (%) methionine in final composite protein $X_i$ = percent (%) of legume seed or methionine-containing material in final mixture $P_i$ = percent (%) of protein (generally, Nitrogen × 6.25) in legume seed or methionine-containing material $M_i$ = percent (%) of methionine in protein of legume seed or methionine-containing material For a mixture containing blackeye beans (BB) and sesame seed (SS), the equations are -

$$M_D = \frac{X_{BB} P_{BB} M_{BB} + X_{SS} P_{SS} M_{SS}}{X_{BB} P_{BB} + X_{SS} P_{SS}}$$

$$X_{BB} + X_{SS} = 100$$

From an appropriate published source (FAO) the following values can be obtained:

Blackeye beans contain 25% protein of which 1.5% is methionine.

Sesame seeds contain 19% protein of which 3.3% is methionine.

Thus, if a final concentration of 2.4% methionine is desired in the protein blend, the percentage of blackeye beans and sesame seeds can be computed as follows:

$$2.4 = \frac{X_{BB} \times 25 \times 1.5 + X_{SS} \times 19 \times 3.3}{X_{BB} \times 25 + X_{SS} \times 19} \text{ or}$$

$$X_{SS} = 56.8\%$$

Since, $X_{SS} + X_{BB} = 100$, then $X_{BB} = 43.2$. Therefore, one would mix 43.2% of dry blackeye beans with 56.8% of dry sesame seeds to obtain a mixture containing 2.4% methionine in the protein.

As the number of components in the mixture increases, the number of equations must increase correspondingly. For a three component system, the above equations are employed together with the following equation:

$$L_D = \frac{\sum_{i=1}^{n} X_i P_i L_i}{\sum_{i=1}^{n} X_i P_i}$$

wherein $L_D$ = percent (%) lysine in final composite protein $X_i$ = percent (%) of legume seed, methionine-containing or lysine-containing material $P_i$ = percent (%) of protein (generally, Nitrogen × 6.25) in legume seed, methionine-containing, or lysine-containing material $L_i$ = percent (%) of lysine in protein of legume seed, methionine-containing, or lysine-containing material The values for $M_D$ and $L_D$ are fixed according to the range 2.0–2.6% methionine and 4.0–6.0% lysine. The amino acid content and protein content of the legume seed, methionine-containing, and lysine-containing material can be obtained from the FAO.

As an example, if a methionine content of 2.4% and a lysine content of 4.8% is desired in the final mixture, the above equations, after solution, require the use of a mixture of 30% blackeye beans, 37% sesame seed, and 33% rice flour.

It is within the compass of the invention to combine a number of legume seeds with a number of methionine-containing and lysine-containing materials. The amount to use can be determined according to the above equations. However, if it is desired to use four components it is necessary to fix the amount of one of those components, i.e., to generate a fourth equation. For example, if blackeye beans, sesame seed, rice flour, and wheat flour are used, the amount of rice flour can be fixed and the equations employed to solve for the amount of blackeye beans, sesame seeds and wheat flour necessary. In general, if the number of components used is $i$, then the amounts of $i$-3 of the components must be fixed. Other methods of generating equations in a multicomponent system will be obvious to those skilled in the art.

The mixture of mashed legume seeds and methionine-containing material from above is used to prepare the snack product of the invention and is combined with additional ingredients such as spices, seasonings, and the like. The amount of seasonings, spices, etc., is dependent on the flavor desired in the final product. Such amounts can easily be determined by preparing small quantities of the snack items for flavor evaluation and selection.

It is within the compass of the invention to dry the legume seeds after they have been quick-cooked and either prior to or after they have been mashed. In this particular embodiment of the invention, the cooked legume seeds are dried to a moisture content of about 5–15%, preferably about 9–12%, on a dry weight basis. Any conventional means of drying may be used. For example, the cooked seeds can be dried in a tunnel dryer at a temperature of about 50°–200° C. for a period of about 2–8 hours. It should be noted that the drying temperature employed should be that which will yield a legume seed wet bulb temperature of about 50°–90° C., preferably about 60° C.

The dried legume seeds are then ground into a powder, which subsequently can be combined with other ingredients according to the above-mentioned procedure.

Alternately, the powder can be separated into grits and fines. Grits are those particles of legume seed powder of mesh size from 18 to 100 whereas fines are those particles of mesh size 100 and higher. Generally, grits are preferred in preparing snack items of the invention because they cause less absorption of fat in the final product. However, fines can be combined with grits where a larger fat content is desirable in the snack item.

It should be noted that if the cooked legume seeds are mashed prior to drying, less grinding of the dried material may be necessary to produce a satisfactory powder therefrom.

Generally, the above mixture should contain about 25-40% (based on the total weight of ingredients prior to the addition of water) legume seeds prepared as described above. A typical formulation for blackeye beans is the following: 30% legume seeds, 27% cereal grain flour, 14% oil seed, 7% oil seed flour, 17% starch, and 5% other ingredients. It should be noted that the proportions of ingredients may vary depending on the nature of the legume seed used and the product desired; however, the mixture should contain about 25 to 40% legume seeds. Good nutritional balance is the criterion for selection of the proper formulation of ingredients.

It is preferred, although not mandatory, to incorporate an emulsifying agent into the ingredients which are combined to form the product. As an emulsifier one may use sodium stearoyl-2-lactylate, ethoxylated monoglyceride, and the like. The amount of emulsifier employed is about 0.1 to 2% based on the total weight of dry ingredients.

The legume seeds combined with other ingredients are next mixed with water to form a dough. Usually, water is added until its concentration therein is about 45 to 55%, based on the weight of dry ingredients. The water, legume seeds, and other ingredients are mixed together for a period of about 2 to 10 minutes. It should be noted that the amount of water added should be adjusted to avoid producing a dough which is either too dry or too sticky.

The so-prepared dough is extruded into thin sheets preferably about 1 to 2 mm in thickness (about equivalent to a standard potato chip). The sheets are cut into pieces approximately 3 to 6 cm in width and 4 to 7 cm in length. The size and shape of the cut pieces are determined by the size and shape desired in the final product. Thus, the pieces may be cut into circles, squares, and the like. Furthermore, the pieces can be formed into scoops or other shapes convenient for using the snack item with dip.

In a preferred embodiment of the invention the above sheets are cut into oval-shaped pieces approximately 5 cm in width and 6 cm in length. A 2 to 3 cm circular or eliptical hole is cut in the center of the oval piece leaving an oval shaped strip 1 to 1.5 cm wide along its width and 1.5 to 2 cm wide along its length.

A number of advantages result from the above oval strip-shape of the product. The so-prepared snack item, when finish-fried, can easily be accommodated in a cylindrical package. The hole in the center of the snack item allows the item to be removed easily from a cylindrical package, e.g., by inserting a finger therethrough and lifting the item from the package. Another advantage is that the so-shaped snack item may be fried in a hemi-cylindrical perforated mold, thus yielding a product with a circular silhouette shape that can be packed efficiently in a cylindrical package without wasted space. The oval strip-shape thus has many advantages over conventionally-formed snack products.

The so-shaped pieces are next fried in an edible oil to develop the desired flavor, color, and texture, and to reduce the moisture level of the piece. Generally, excellent results are obtained by frying in oil for a period of 10 to 20 seconds at a temperature of 190° to 210° C. The moisture content of the so-fried piece is about 1 to 5% and the content of fat is about 25 to 40%. The color desired is usually golden brown.

Following the frying step it may be desirable to salt the so-prepared product. Generally, about 1-3% salt based on the weight of the product is introduced on the surface of the piece. Other flavoring agents may be applied at this point.

The products of the invention are crisp, yet tender, having a texture similar to conventional potato or other chips. Furthermore, the ready-to-eat legume seed products are firm and are useful as carriers for dips, pastes, and spreads.

The invention has wide utility and products of the invention can be prepared from legume seeds of all types, e.g., seeds of the genus Phaseolus including common beans such as large white, small white, pinto, red kidney, cranberry, lima, etc.; the genus Pisum including smooth and wrinkled peas; the genus Vigna including the blackeye beans (or blackeye peas as they are often termed); the genus Lens including lentils; the genus Cicer including garbanzo or chick peas; the genus Soja, that is, soybeans, etc.

EXAMPLES

The invention is further demonstrated by the following illustrative examples.

EXAMPLE 1

PREPARATION OF SNACK ITEM FROM BLACKEYE BEANS

Dry blackeye beans (*V. unguiculata*) (1 kg) were soaked for 18 hrs. in three volumes of water containing 2.0% sodium chloride, 0.45% sodium bicarbonate, and 0.15% sodium carbonate. The soaked beans were removed from the soaking solution and cooked in boiling water (2 volumes) for 10 min.

The cooked beans were dried in a tunnel dryer at 49° C. for 6½ hrs. at an air velocity of 200.3 meters per min. to a moisture content of 9%. After drying, the beans were ground in a LABCONCO grinder (manufactured by Laboratory Construction Company) at setting number 1, which is the finest of possible grinds. The resulting powder was fractionated on a 100 mesh sieve; those particles of mesh size less than 100 were designated grits (500 g) and those greater than 100 were designated fines (500 g).

A 30.4 g.-sample of grits was mixed with 27.0 g. of rice flour, 16.9 g. of Fribind starch (manufactured by A. E. Staley Mfg. Co.), 13.5 g. of sesame seed, 6.8 g. of lo-fat sesame flour, 1.0 g. of xanthan gum, 2.0 g. of Binasol (pre-gelatinized starch made by A. E. Staley Mfg. Co.), 0.7 g. of Emplex (sodium stearoyl-2-lactylate produced by Patco Products), 1.4 g. of sodium chloride, 0.2 g. of onion powder and 0.1 g. dry Beta-carotene Beadlets (manufactured by Hoffman La Roche, Inc., and containing 2.4% β-carotene). Water (72 g.) was added to the above ingredients and the resulting mixture was subjected to the action of a pin mixer for 5 min.

The dough which formed was passed through a dough sheeter with smooth stainless steel rollers to give sheets 1 mm thick.

The sheets were cut into oval pieces 5 cm by 6 cm. Concomitantly, a 2.2 cm hole was cut into the center of the piece leaving an oval-shaped strip 1.4 cm side along its length and 1.8 cm wide along its width.

The so-cut pieces were placed in a perforated, hemi-cylindrical, stainless steel mold and fried in vegetable oil at 205° C. for 15 sec. The shaped pieces were discharged from the mold, drained and salted.

The product was crisp, but tender, and firm. Judges, trained in the art of food tasting, compared the instant snack item to Pringles potato chips and Fritos corn chips. The snack food of the invention was rated equal to or better than the potato and corn chips in flavor and texture. Furthermore, the snack item of the invention had a protein efficiency ratio (PER) of 2.4 on a scale where 2.5 (Casein) is considered good quality protein.

EXAMPLE 2

PREPARATION OF SNACK ITEM FROM GARBANZO BEANS

The procedure described in Example 1 was followed. Garbanzo bean grits (28.5 g., moisture content 9%) were combined with 35.7 g. rice flour, 14.3 g. wheat flour, 7.2 g. of sesame seed, 1.1 g. xanthan gum, and 2.1 g. Binasol, 2.5 g. onion powder, 0.15 g. garlic powder, 0.1 g. dry Beta-carotene Beadlets, 7.15 g. sugar, and 1.1 g. salt. Water (64.3 g.) was incorporated into the mixture to form a dough.

The so-produced snack item was evaluated by a panel of trained judges and was rated equal to or better than several commercial snack products.

EXAMPLE 3

PREPARATION OF SNACK ITEM FROM BLACKEYE BEANS

Raw, quick-cooking blackeye beans were prepared and cooked as described in Example 1. Forty-six g. of cooked beans were combined with 14.6 g. of water and pressed through a commercial dicer containing 0.15 cm holes. The diced beans were combined with the following ingredients to form a dough: 15.4 g. of rice flour, 10.3 g. of Fribind starch, 6.9 g. of whole decorticated sesame seeds, 3.4 g. of low-fat sesame flour, 1.6 g. Binasol, 0.8 g. sodium chloride (salt), 0.5 g. xanthan gum, 0.16 g. onion powder, 0.04 g. garlic powder, and 0.04 g. dry Beta-carotene Beadlets. The ingredients were mixed thoroughly and the resulting dough was formed into sheets as described previously (Example 1). Snack items were prepared from the so-formed pieces as described in Example 1.

The cooked, crisp snack items were drained, salted (1% salt), and cooled. The flavor and texture properties of the snack items were essentially identical to those prepared from blackeye bean grits according to Example 1.

Having thus described our invention, we claim:

1. A process for preparing a nutritionally balanced protein food product with a base of legume seed selected from the group consisting of the genus Phaseolus, the genus Pisum, the genus Vigna, the genus Lens, the genus Cicer, and the genus Soja, which consists of
    (a) treating the legume seeds to render them quick-cooking,
    (b) cooking the so-treated seeds,
    (c) mashing the so-cooked seeds,
    (d) mixing the mashed seeds with an amount of methionine-containing material such that the final concentration of methionine in said protein food product is about 2.0–2.6% and of lysine is about 4.0–6.0%, based on the weight of the total protein in the mixture,
    (e) adding water to the mixture in an amount sufficient to raise the moisture content thereof to about 45 to 55%, on a dry weight basis, and thereby to form a dough,
    (f) extruding the dough into sheets,
    (g) cutting the sheets into pieces, and
    (h) frying the so-cut pieces in edible oil.

2. The process of claim 1 wherein the legume seeds are treated to render them quick-cooking by
    soaking the seeds for about 2 to 24 hours at ambient temperature and atmospheric pressure in an aqueous hydrating medium consisting of water, sodium chloride, sodium bicarbonate, and sodium carbonate.

3. The process of claim 1 wherein the dough is extruded into sheets about 1 to 2 millimeters thick.

4. The process of claim 3 wherein the sheets are cut into pieces
    oval-shaped, approximately 3 to 6 centimeters in width and 4 to 7 centimeters in length,
    with a hole about 2 to 3 centimeters in diameter cut into the center of the piece,
    leaving an oval-shaped strip about 1 to 1.5 centimeters wide along its width and 1.5 to 2 centimeters wide along its length.

5. The process of claim 1 wherein the methionine-containing material is a cereal grain flour.

6. The process of claim 1 wherein the methionine-containing material is an oil seed.

7. The process of claim 1 wherein the methionine-containing material is an oil seed flour.

* * * * *